US007657658B2

(12) United States Patent
Tankov et al.

(10) Patent No.: US 7,657,658 B2
(45) Date of Patent: Feb. 2, 2010

(54) RESOURCE ADAPTER DEPLOYMENT

(75) Inventors: Nikolai D. Tankov, Sofia (BG); Peter K. Matov, Sofia (BG)

(73) Assignee: SAP AG, Walldorf (DE)

( * ) Notice: Subject to any disclaimer, the term of this patent is extended or adjusted under 35 U.S.C. 154(b) by 859 days.

(21) Appl. No.: 10/863,159

(22) Filed: Jun. 7, 2004

(65) Prior Publication Data

US 2006/0080435 A1  Apr. 13, 2006

(51) Int. Cl.
*G06F 15/16* (2006.01)
(52) U.S. Cl. .................. 709/250; 709/218; 709/220; 709/226; 709/229; 717/116; 717/120
(58) Field of Classification Search .......... 709/201, 709/203, 220, 310, 318, 218, 226, 229, 250; 717/116, 120; 718/101; 719/328
See application file for complete search history.

(56) References Cited

U.S. PATENT DOCUMENTS

| | | | |
|---|---|---|---|
| 5,613,114 A | 3/1997 | Anderson et al. | |
| 5,790,789 A | 8/1998 | Suarez | |
| 6,003,061 A | 12/1999 | Jones et al. | |
| 6,125,382 A | 9/2000 | Brobst et al. | |
| 6,233,585 B1 | 5/2001 | Gupta et al. | |
| 6,260,057 B1 | 7/2001 | Eykholt et al. | |
| 6,411,983 B1 | 6/2002 | Gallop | |
| 6,519,605 B1 | 2/2003 | Gilgen et al. | |
| 6,691,304 B1 | 2/2004 | Zhang et al. | |
| 6,721,777 B1 * | 4/2004 | Sharma | 718/101 |
| 6,766,349 B1 | 7/2004 | Belkan | |
| 6,778,990 B2 | 8/2004 | Garcia et al. | |
| 6,832,238 B1 * | 12/2004 | Sharma et al. | 709/201 |
| 6,886,041 B2 | 4/2005 | Messinger et al. | |
| 6,976,061 B1 * | 12/2005 | Sharma | 709/220 |
| 7,007,075 B1 | 2/2006 | Coffey | |
| 7,036,110 B2 * | 4/2006 | Jeyaraman | 717/120 |
| 7,036,124 B1 | 4/2006 | Patterson | |
| 7,058,950 B2 * | 6/2006 | Jeyaraman | 718/104 |
| 7,080,119 B2 | 7/2006 | Felt et al. | |
| 7,089,317 B2 * | 8/2006 | Jeyaraman et al. | 709/230 |
| 7,089,584 B1 * | 8/2006 | Sharma | 726/4 |
| 7,165,249 B2 * | 1/2007 | Potter et al. | 717/174 |
| 7,260,819 B2 * | 8/2007 | Spotswood et al. | 717/177 |
| 7,340,714 B2 * | 3/2008 | Upton | 717/102 |
| 2002/0046230 A1 | 4/2002 | Dieterich et al. | |
| 2002/0144002 A1 * | 10/2002 | Matena et al. | 709/310 |

(Continued)

OTHER PUBLICATIONS

"OA mailed Sep. 13, 2007 for U.S. Appl. No. 10/858,661", Whole Document.

(Continued)

*Primary Examiner*—Saleh Najjar
*Assistant Examiner*—Waseem Ashraf
(74) *Attorney, Agent, or Firm*—Schwegman, Lundberg & Woessner, P.A.

(57) ABSTRACT

A system and method for deployment of a resource adapter are described. Under an embodiment of the invention, a method comprises storing deployment information for a resource adapter, the deployment information comprising one or more elements to configure the resource adapter; deploying the resource adapter, deploying the resource adapter comprising implementation of the one or more elements to configure the resource adapter; and providing a connection between a server application and an external resource using the resource adapter.

23 Claims, 6 Drawing Sheets

U.S. PATENT DOCUMENTS

| | | | |
|---|---|---|---|
| 2002/0156664 A1* | 10/2002 | Willcox et al. | 705/7 |
| 2002/0184401 A1* | 12/2002 | Kadel et al. | 709/315 |
| 2003/0074217 A1 | 4/2003 | Beisiegel et al. | |
| 2003/0093402 A1 | 5/2003 | Upton et al. | |
| 2003/0097574 A1* | 5/2003 | Upton | 713/183 |
| 2003/0105884 A1* | 6/2003 | Upton | 709/318 |
| 2003/0110315 A1* | 6/2003 | Upton | 709/328 |
| 2003/0145074 A1 | 7/2003 | Penick | |
| 2003/0182426 A1 | 9/2003 | Hapner et al. | |
| 2003/0182459 A1* | 9/2003 | Jeyaraman | 709/310 |
| 2003/0191803 A1* | 10/2003 | Chinnici et al. | 709/203 |
| 2003/0229888 A1* | 12/2003 | Spotswood et al. | 717/116 |
| 2003/0236923 A1* | 12/2003 | Jeyaraman et al. | 709/318 |
| 2004/0015859 A1* | 1/2004 | Potter et al. | 717/120 |
| 2004/0015974 A1* | 1/2004 | Jeyaraman | 718/104 |
| 2004/0034859 A1* | 2/2004 | Potter et al. | 719/310 |
| 2004/0078495 A1* | 4/2004 | Mousseau et al. | 710/1 |
| 2004/0098726 A1 | 5/2004 | Currie et al. | |
| 2004/0109413 A1 | 6/2004 | Hierholzer et al. | |
| 2004/0172639 A1* | 9/2004 | Luo et al. | 719/328 |
| 2004/0215473 A1 | 10/2004 | Bhogi et al. | |
| 2004/0244004 A1 | 12/2004 | Pardon et al. | |
| 2005/0028164 A1* | 2/2005 | Neuwald et al. | 719/310 |
| 2005/0060169 A1* | 3/2005 | Gangadharan et al. | 705/1 |
| 2005/0267918 A1* | 12/2005 | Gatev et al. | 707/203 |
| 2006/0041662 A1 | 2/2006 | Georgiev et al. | |
| 2006/0075115 A1 | 4/2006 | Chitilian et al. | |

OTHER PUBLICATIONS

"OA Mailed Dec. 28, 2007 for U.S. Appl. No. 10/861,267", Whole Document.

DeMichiel, Linda , et al., "JSR 220: Enterprise JavaBeansTM,Version 3.0, EJB Core Contracts and Requirements", *Sun Microsystems, EJB 3.0 Expert Group*, (May 2, 2006), Whole Document.

DeMichiel, Linda , et al., "JSR 220: Enterprise JavaBeansTM,Version 3.0, Java Persistence API", *Sun Microsystems, EJB 3.0 Expert Group*, (May 2, 2006), Whole Document.

Shannon, Bill, "JavaA 2 Platform, Enterprise Edition Specification. v1.4", *Sun Microsystems*, (Nov. 24, 2003), Whole Document.

USPTO, "FOA Mailed Oct. 27, 2008 for U.S. Appl. No. 10/860,839", Whole Document.

USPTO, "OA Mailed Sep. 18, 2008 for U.S. Appl. No. 10/858,661", Whole Document.

"Final Office Action Mailed Apr. 4, 2008 for U.S. Appl. No. 10/858,661", Whole Document.

USPTO, "OA Mailed Apr. 15, 2008 for U.S. Appl. No. 10/860,839", Whole Document.

USPTO, "OA Mailed Aug. 11, 2008 for U.S. Appl. No. 10/856,249", Whole Document.

USPTO, "OA Mailed Sep. 3, 2008 for U.S. Appl. No. 10/858,657", Whole Document.

USPTO, "FOA Mailed Jul. 9, 2008 for U.S. Appl. No. 10/861,267", Whole Document.

* cited by examiner

RESOURCE ADAPTER DEPLOYMENT

TECHNICAL FIELD

Embodiments of the invention generally relate to the field of client/server systems and, more particularly, to a system and method for resource adapter deployment.

BACKGROUND

In client-server operations, a server may provide connections between applications and various external resources. A communications process requires the provision of an interface between the application and the external resource. For example, a resource adapter may be utilized to couple the resource with the application.

In the operations of a server, communication needs are changed as applications are processed, with varying resources and thus varying resource adapters being needed at any given time. For this reason, the server may be required to deploy and terminate numerous different resource adapters to respond to system needs.

However, each instance of deploying or terminating a resource adapter requires processing time and effort. Further, the deployment of a resource adapter generally includes certain efforts to customize or configure the resource adapter for the current needs and certain efforts to communicate parameters to the agents involved. For this reason, any processes that can reduce the complications that are involved in resource adapter deployment or that can increase the usage of deployed resource adapters can assist in maximizing system performance.

SUMMARY OF THE INVENTION

A system and method for resource adapter deployment are described.

According to a first embodiment of the invention, a method includes storing deployment information regarding a resource adapter, with the deployment information including one or more elements for configuring the resource adapter; deploying the resource adapter, deploying the resource adapter including implementation of the elements to configure the resource adapter; and providing a connection using the resource adapter.

Under a second embodiment of the invention, a server includes an application, with the application to be connected with an external resource; a memory including a file, the file containing deployment information for a resource adapter to be used to connect the application and the external resource; and a resource system to provide the connection, with the resource adapter being configured based at least in part on the deployment information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
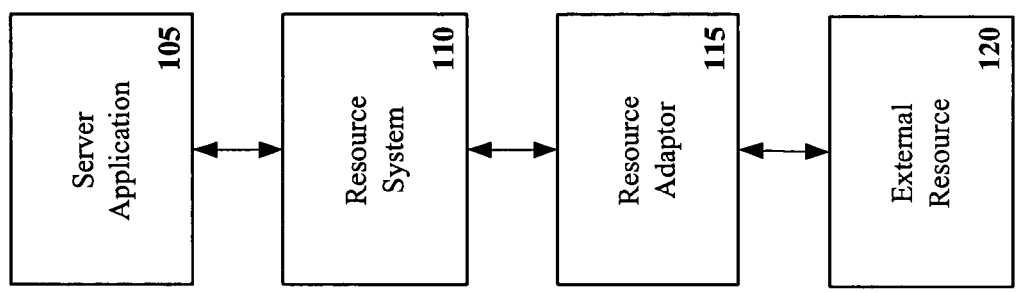
FIG. 1 is an illustration of an embodiment of a simple resource system for a server.

Embodiments of the invention are generally directed to a system and method for resource adapter deployment.

Under an embodiment of the invention, a resource adapter is deployed using stored deployment information. In one embodiment, the deployment information is used at deploy time to establish the resource adapter. In one embodiment, the deployment information is used to customize or configure a resource adapter.

Under an embodiment of the invention, deployment information is stored in a format to allow simple processing at deploy time. In one embodiment, a document type definition (DTD) is used to create XML (extensible markup language) documents to be used in configuring a resource adapter for enterprise information system (EIS) connectivity at deploy time.

Under an embodiment of the invention, in addition to a standard descriptor, a DTD is used to create an additional deployment descriptor for a resource adapter. Under an embodiment of the invention, the deployment descriptor for a resource adapter contains customization settings, which are applied at deploy time for the resource adapter.

An embodiment of the invention may operate in a Java environment, such as described in the Java 2 enterprise edition (J2EE) environment provided under the J2EE specification, J2EE (Java 2 Platform, Enterprise Edition), including as provided in the J2EE specification, version 1.4, Nov. 24, 2003.

Under an embodiment of the invention, connections for a server are provided in conformity with the J2EE Connector Architecture Specification (JCA), including version 1.0 Aug. 22, 2001 and version 1.5, Nov. 24, 2003. The J2EE connector architecture provided by the JCA enables J2EE components to interact with enterprise information systems (EISs) and for the EISs to interact with J2EE components. A resource adapter is a component that implements the J2EE connector architecture for a specific EIS. A connector is a mechanism to provide connectivity to EISs, with a connector being specific to a particular EIS and consisting of the resource adapter and any application development tools for EIS connectivity. A resource adapter is generally stored in a resource adapter archive (RAR) file and can be deployed on any J2EE server to mediate communication between the server and the EIS via contracts. A RAR file is type of Java archive (JAR) file, with rar being the standard file extension for a RAR file.

Under an embodiment of the invention, directory and naming functionality includes that made pursuant to the Java Naming and Directory Interface (JNDI). A JNDI is described in the JNDI Application Programming Interface (API), including version 1.2, Jul. 14, 1999, and the JNDI Server Provider Interface (SPI), including version 1.3, Jul. 14, 1999.

Under an embodiment of the invention, a resource adapter is deployed via a RAR (Resource Adapter Archive) archive file. The RAR archive contains information regarding resource adapter deployment. In one embodiment of the invention, a RAR archive contains two XML files, which may, for example, be located under the standard META-INF directory. A first XML file is ra.xml, which is a file specified in the JCA specification. The second XML file is an additional deployment descriptor for the resource adapter, the additional descriptor being referred to herein as connector-j2ee-engine.

Under an embodiment of the invention, an additional deployment descriptor contains additional information regarding a resource adapter that is to be implemented when the resource adapter is deployed. In an embodiment, the component includes information about:

(1) The loader that will load the resource adapter. This may include:

(a) Loader name. The load name can be used in situations in which multiple applications will use the same resource adapter. In this case, it is not necessary to pack the same resource adapter in the archive of each application. Instead, it is possible to deploy the resource adapter and to specify a reference from the application loader to the loader of the resource adapter.

(b) Necessary references to other loaders.

(2) Connection pooling and expiration control. These properties are utilized to provide for increased performance of an EIS and assist in maintaining the connections to the EIS.

(3) User-store, authentication type, and user mapping for authorization for the EIS.

(4) The representation of the resource adapter in the JNDI, which determines access to the resource adapter. This representation may include:

(a) The JNDI name of the resource adapter.

(b) Aliases for the resource adapter, which may be used instead of the JNDI name. The aliases may be utilized when multiple applications use a single resource adapter. In this way, it is not necessary to deploy multiple resource adapters to the same EIS. Avoidance of multiple connection pooling may assist in preventing connection shortage for a server.

Under an embodiment of the invention, resource adapter properties are represented as an XML document. The representation of this information in XML form then allows the information to be packed in the RAR archive under the META-INF directory together with the ra.xml file, thereby allowing a simple deployment procedure for a resource adapter.

FIG. 1 is an illustration of an embodiment of a simple resource system for a server. In this illustration, a server application 105 may require a connection with an external resource 120. In this illustration, a resource system 110 is utilized to provide a connection via a resource adapter 115. In this embodiment, the deployment of the resource adapter 115 by the resource system 110 is based at least in part on deployment information. Under an embodiment of the invention, the deployment information is stored and is used at deployment time to customize or configure the resource adapter 115 for the communication between the server application 105 and the external resource 120.

Figure 2:
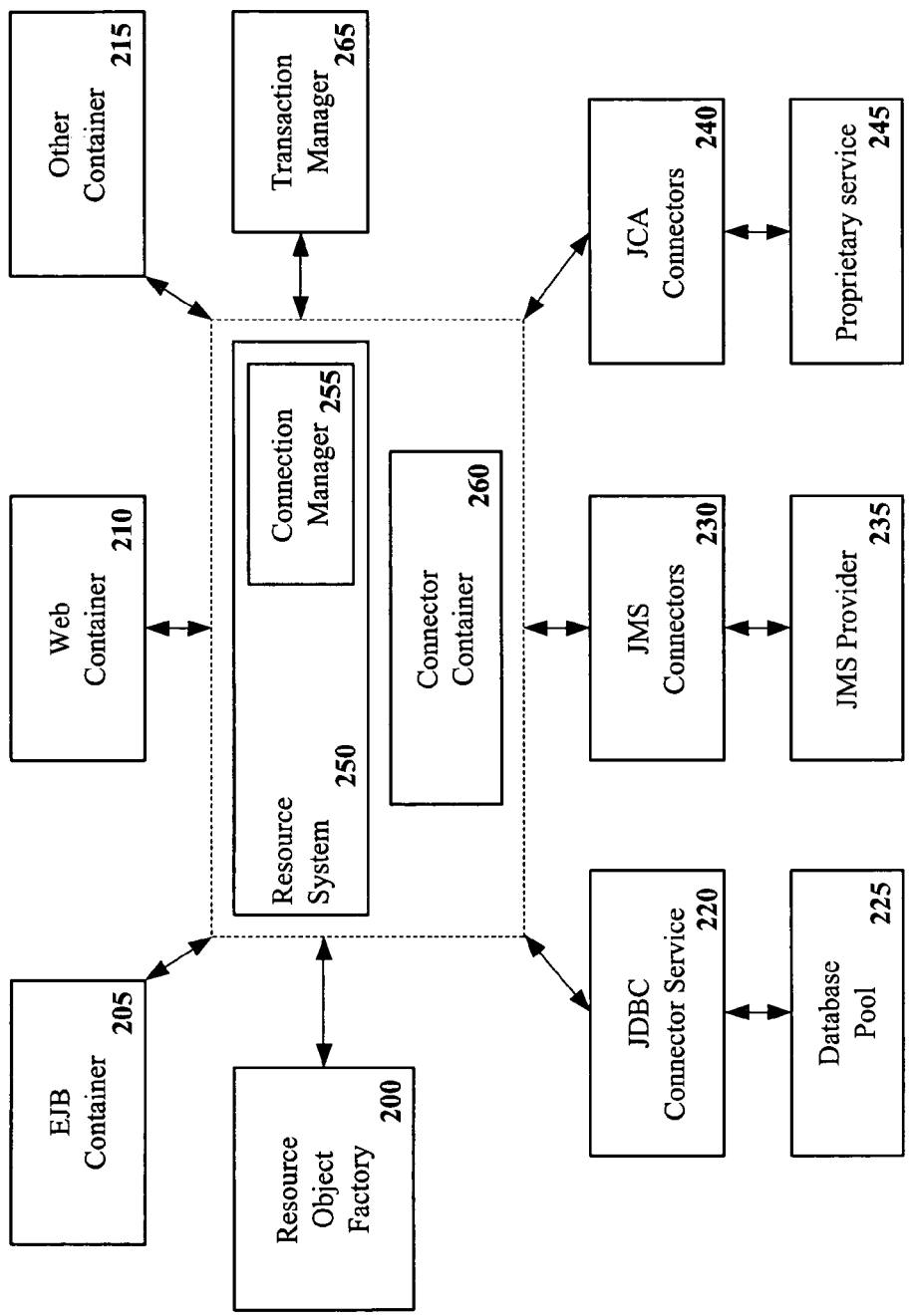
FIG. 2 is an illustration of an embodiment of a server utilizing a resource object factory.

FIG. 2 is an illustration of an embodiment of a server utilizing a resource object factory. In this illustration, program object containers include an enterprise Java bean (EJB) container 205, a web container 210, and another arbitrary container 215. External resources include a database pool 225 that may be connected using a JDBC (Java database connection) connector server 220, a JMS (Java message service provider) 235 that may be connected utilizing JMS connectors 230, and a proprietary service 245 that may be connected using JCA (Java connector architecture) connectors 240. The resource system 250 includes a connection manager 255, and utilizes a connector container 260 to store managed connections. A transaction manager 265 maintains a relationship with the resource system 250. Under an embodiment of the invention, a resource object factory 200 is present to assist the resource system 250 in the generation of connections between applications and resources. Under an embodiment of the invention, the resource system uses stored deployment information at runtime to deploy resource adapters to provide connectivity to the external resources.

Figure 3:
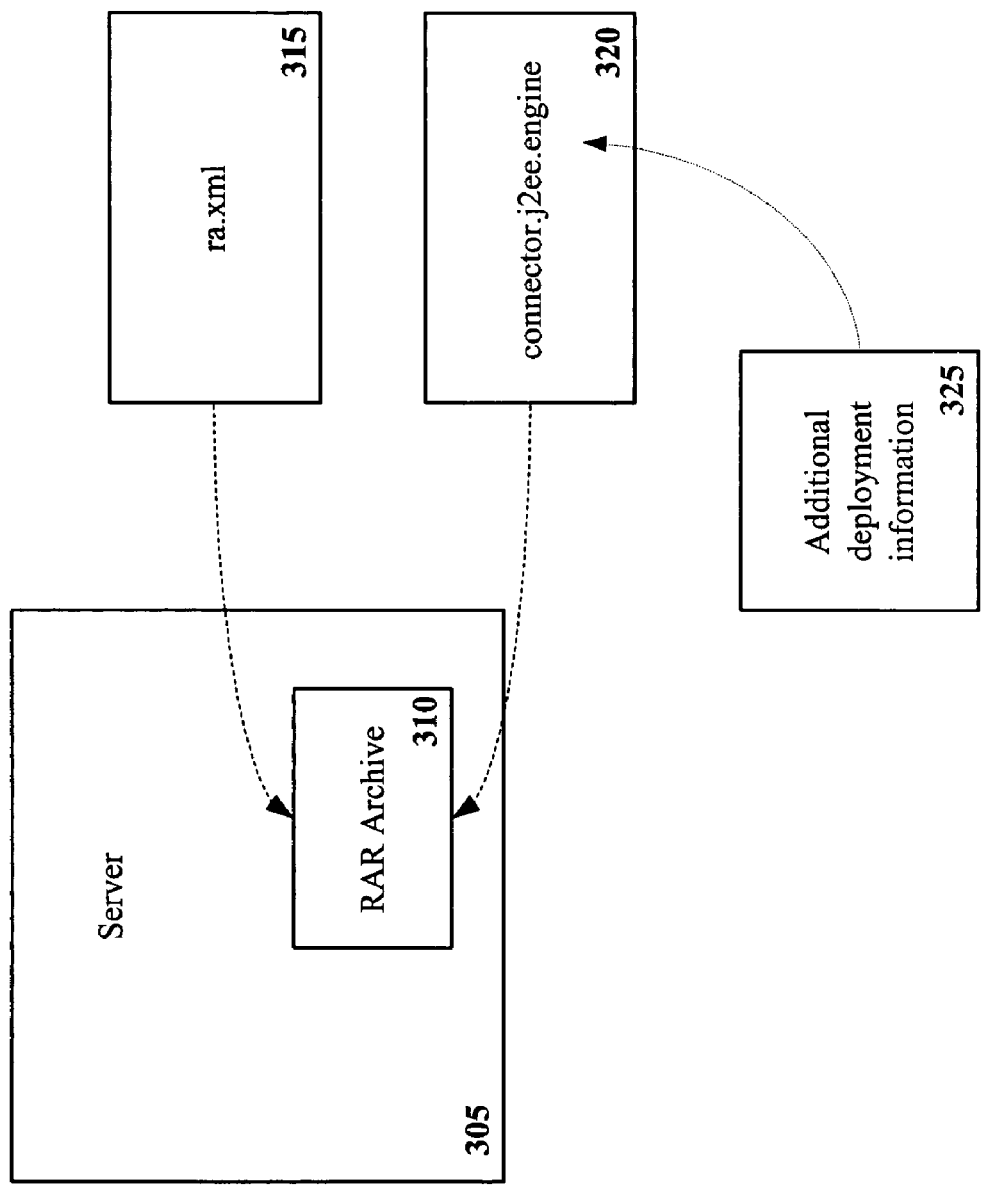
FIG. 3 illustrates an embodiment of storage of deployment information for a resource adapter.

FIG. 3 illustrates an embodiment of storage of deployment information for a resource adapter. In this illustration, a server 305 includes a RAR archive 310 for a resource adapter. In this embodiment, the RAR archive 310 includes both an ra.xml file, as provided in the Java connector specification, and an additional file 320 containing additional deployment information 325, the file being designated here as connector.j2ee.engine. Under an embodiment of the invention, at deployment time the resource adapter will be customized or configured for operation using the additional deployment information provided in connector.j2ee.engine 320.

Figure 4:
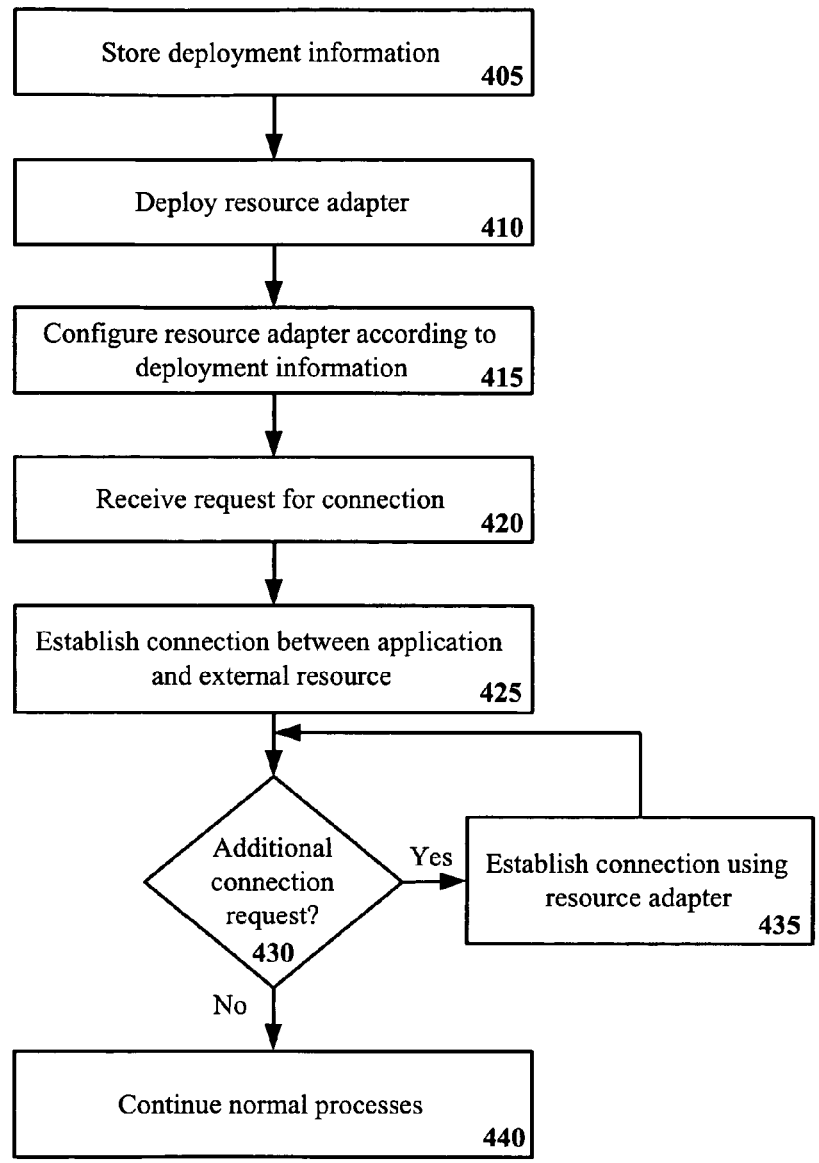
FIG. 4 is a flow chart illustrating an embodiment of deployment of a resource adapter.

FIG. 4 is a flow chart illustrating an embodiment of deployment of a resource adapter. In this illustration, deployment information regarding a resource adapter is stored 405. Under an embodiment of the invention, the deployment information is stored as an XML file, allowing the information to be stored in the RAR archive for the resource adapter. The resource adapter is deployed 410. In the deployment of the resource adapter, the adapter is modified or configured at least in part based upon the deployment information 415. Upon receipt of a request for a connection 420, a connection between an application and an external resource is established 425 using the resource adapter. The process may proceed with additional connection requests that can utilize the same resource adapter 430. If there are any such requests, an additional connection may be established utilizing the resource adapter 435. Upon establishing the connection, the process continues with normal operations 440.

Figure 5:
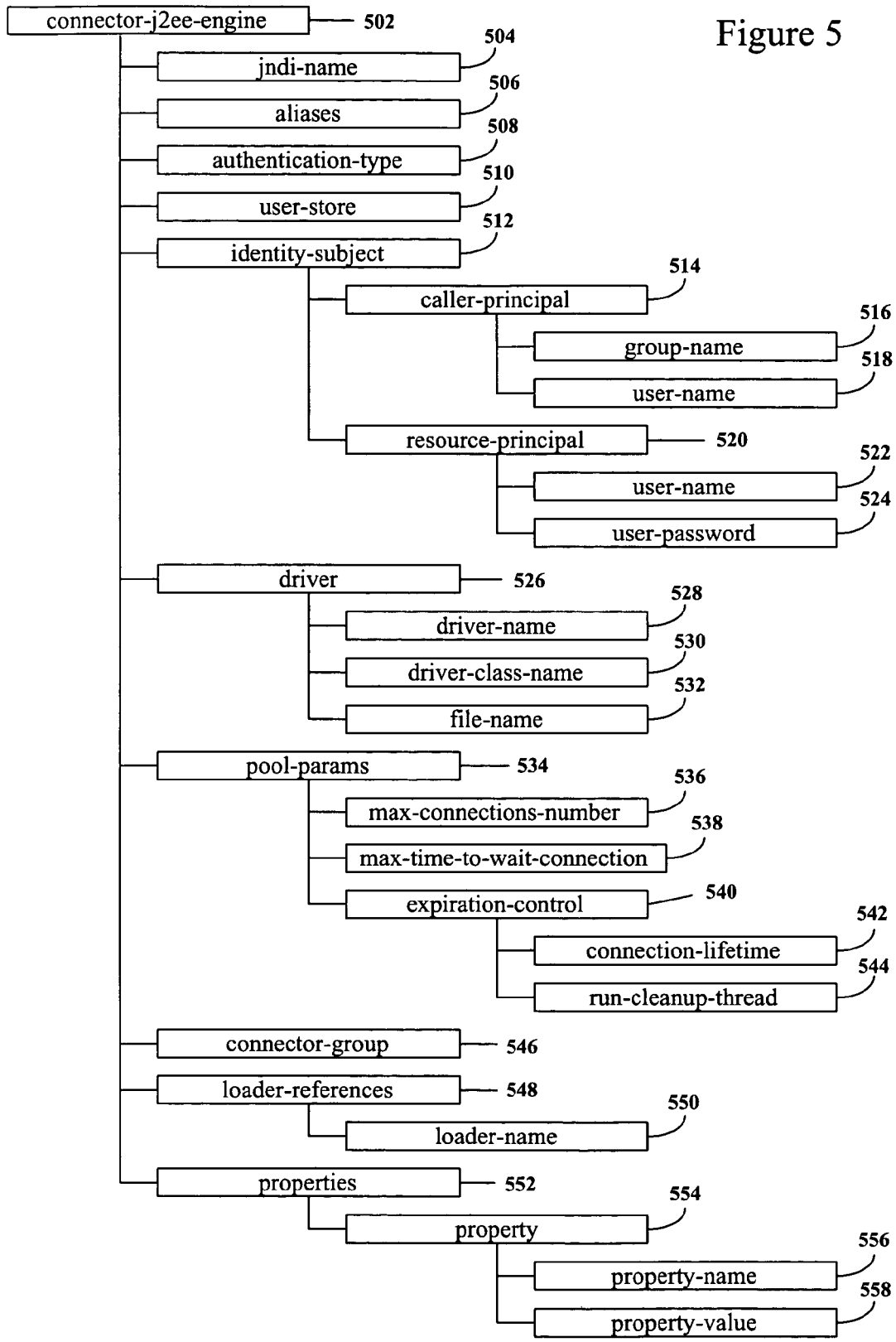
FIG. 5 illustrates an embodiment of a deployment descriptor.

FIG. 5 illustrates an embodiment of a deployment descriptor. Under an embodiment of the invention, the deployment descriptor (with root element designated as connector-j2ee-engine) contains information for the deployment of a resource adapter, the information being applied at deployment time. Under an embodiment of the invention, the deployment descriptor is included in an archive file for a resource adapter. The information shown in FIG. 5 shows a possible implementation of a deployment descriptor, but the actual elements may vary according to the embodiment.

As shown in FIG. 5, connector-j2ee-engine 502 is the root element for the deployment descriptor. This element contains data such as security information, information about the JNDI name and any alias or aliases defined for the resource adapter, the driver for JDBC connectivity for this application, the declaration of specific properties (an optional element), loader references, and the definition of connection pool parameters (an optional element).

Element: connector-j2ee-engine (jndi-name, alias, authentication-type, user-store, identity-subject, driver, pool-params, connector-group, loader-references, properties)

Under an embodiment of the invention, a jndi-name element 504 defines the name used for binding the resource adapter in naming. This name is used when looking up the resource adapter and is used in connector-j2ee-engine 502. For example: <jndi-name>myAdapter</jndi-name>

Element: jndi-name (#PCDATA)

Under an embodiment of the invention, an alias element 506 defines an alternative name for a resource adapter. Multiple such aliases may be used. Such element enables a user to utilize a resource adapter from multiple applications, with each application utilizing a different alias for the resource adapter. The element is used in connector-j2ee-engine 502. For example: <alias> myRA </alias>

Element: alias (#PCDATA)

Under an embodiment of the invention, an authentication-type element 508 defines the mode used for authenticating resources. In one embodiment, a user may choose from the following options:

- Caller Impersonation—Used when the credentials of the caller principal are directly passed to an EIS and used for authentication of the resource principal.
- Credentials Mapping—Used when the credentials of the caller principal are replaced by the credentials that are used for authentication to an EIS; in this case, a user specifies a user-store where the EIS credentials are stored.
- Configured Identity—Used when all caller principals obtain a connection to the EIS using use the same pre-configured identity. A user specifies either a user-store that contains the identity, or a user name and a password for the configured identity.
- Principal Mapping—Used when particular caller principals are mapped to an EIS principal. In an embodiment, only authorized caller principals can obtain a connection using a specific identity. A user may either specify the user-store where this identity is stored, or enter the name and the password of the resource principal.

The element is used in connector-j2ee-engine 502. For example: <authentication-type> Principal Mapping </authentication type>

Element: authentication-type (#PCDATA)

Under an embodiment of the invention, a user-store element 510 defines a user-store configuration that is used by the resource adapter to store authentication information. The element is used in connector-j2ee-engine 502. For example: <user-store> CONNECTOR </user-store>

Element: user-store (#PCDATA)

Under an embodiment of the invention, an identity-subject element 512 contains security information, which enables the authentication of a user (a principal) to the EIS resources. The element defines an identity subject with the specified mapping of caller and resource principal data. The element is used in connector-j2ee-engine 502. For example:

```
<identity-subject>
    <caller-principal>
        <group-name>
            administrators
        </group-name>
        <user-name>
            Administrator
        </user-name>
    </caller-principal>
    <resource-principal>
        <user-name>
            Guest
        </user-name>
        <user-password>
            guest
        </user-password>
    </resource-principal>
<identity-subject>
```

Element: identity-subject (caller-principal, resource-principal)

Under an embodiment of the invention, a caller-principal element 514 encapsulates information about the names of users or groups (or both) who are authorized to log on to the SAP J2EE Engine. This element is optional, and is used in identity-subject 512.

Element: caller-principal (group-name, user-name)

Under an embodiment of the invention, a resource-principal element 520 encapsulates authentication information about a user who is authorized to access a particular resource in an EIS. The information may include a username and a user password. This element is used in identity-subject 514.

Element: resource-principal (user-name, user-password)

Under an embodiment of the invention, a group-name element 516 defines the name of a group on the J2EE engine. This element is used in caller-principal 514.

Element: group-name (#PCDATA)

Under an embodiment of the invention, a user-name element 518 defines a valid name, under which a user is authorized to log on to the server and access resources. This element is used in caller-principal 514 and resource-principal 520.

Element: user-name (#PCDATA)

Under an embodiment of the invention, a user-password element 524 defines a valid password that is used to authenticate a user to the EIS. This element is used in resource-principal 520.

Element: user-password (#PCDATA)

Under an embodiment of the invention, a driver element 526 defines a driver that can be used by a connector to obtain a connection to a relational database. The system registers that the specified driver has been deployed with the current application and loads the driver with the application loader. The information in this element may include the driver class name and the archive file name. This element is used in connector-j2ee-engine 502. For example:

```
<driver>
    <driver-name>
        myDriverSapDB
    </driver-name>
    <driver-class-name>
        com.sap.dbtech.jdbc.DriverSapDB
    </driver-class-name>
    <file-name>
        sapdbc.jar
    </file-name>
</driver>
```

Element: driver (driver-name, driver-class-name, file-name)

Under an embodiment of the invention, a driver-name element 526 specifies an optional name for a JDBC driver. This element is used in driver 526.

Element: driver-name (#PCDATA)

Under an embodiment of the invention, a driver-class-name element 530 specifies the fully qualified Java name of the driver class. This element is used in driver 526.

Element: driver-class-name (#PCDATA)

Under an embodiment of the invention, a file-name element 532 defines the name of the driver archive file. This element is used in driver 526.

Element: file-name (#PCDATA)

Under an embodiment of the invention, a pool-params element 534 contains properties of a connection pool. In the embodiment, this element is optional because a user may choose to use default properties for connection pooling. This element is used in connector-j2ee-engine 502.

Element: pool-params (max-connections-number, max-time-to-wait-connection, expiration-control)

Under an embodiment of the invention, a max-connections-number element 536 defines the maximum number of connections to the EIS that can be stored in the connection pool. This element is used in pool-params 534.

Element: max-connections-number (#PCDATA)

Under an embodiment of the invention, a max-time-to-wait-connection element 538 defines a timeout condition for a getconnection( ) request. For example, if no connection is available in the connection pool and the number of connections acquired from the EIS equals the maximum number of connections <"max-connections-number">, and no free connection becomes available for the time period max-time-to-wait-connection seconds, then an exception will be thrown. Under an embodiment of the invention, the timeout condition may be disabled, such as by setting the timeout value to zero, "max-time-to-wait-connection"=0. This element is used in pool-params 534.

Element: max-time-to-wait-connection (#PCDATA)

Under an embodiment of the invention, an expiration-control element is used to manage a connection pool. The element defines how long the connections may stay in the pool and how often the old connection objects are destroyed. This element is used in pool-params 534.

Element: expiration-control (connection-lifetime, run-cleanup-thread)

Under an embodiment of the invention, a connection-lifetime element 542 defines how long a connection may be kept in a connection pool. Once the period specified (such as in seconds) has expired, an old connection is removed from the pool to be replaced by a newer one. This element is used in expiration-control 540.

Element: connection-lifetime (#PCDATA)

Under an embodiment of the invention, a run-cleanup-thread element 544 defines how often the system runs a thread, which will destroy all expired connection objects. In the embodiment, the interval may be specified in seconds. This element is used in expiration-control 540.

Element: run-cleanup-thread (#PCDATA)

Under an embodiment of the invention, a connector-group element 546 defines the classloader for a standalone resource adapter. This element tag is ignored if the adapter is deployed within an application, rather than as a standalone component. If a user sets a connector group, the resource adapter is loaded by a classloader named connector: <connectorGroup>; otherwise, the classloader is connector:default. This element is used in connector-j2ee-engine 502.

Element: connector-group (#PCDATA)

Under an embodiment of the invention, a loader-references element 548 is used when a user deploys a standalone component. The element defines a reference to the classloader that is used to load the resource adapter. For non-standalone components (when the RAR file is deployed within a J2EE application that also contains other components), the loader reference is set to the application level and the resource adapter is loaded with the application loader, and this tag is ignored. This element is used in connector-j2ee-engine 502.

Element: loader-references (loader-name)

Under an embodiment of the invention, a loader-name element 550 specifies the name of the classloader that is used to load this resource adapter. This element is used in loader-references 548. For example: <loader-name> connector:my-Adapter <loader-name>

Element: loader-name (#PCDATA)

Under an embodiment of the invention, a properties element 552 encapsulates a set of properties that can be used for additional customization after resource adapter deployment. This element is used in connector-j2ee-engine.

Element: properties (property)

Under an embodiment of the invention, a property element 554 defines a particular property, together with its name and value. This element is used in properties 552.

Element: property (property-name, property-value)

Under an embodiment of the invention, a property-name element 556 defines the name of a particular additional property. This element is used in property 554.

Element: property-name(#PCDATA)

Under an embodiment of the invention, a property-value element 558 defines the value of a particular additional property. This element is used in property 554.

Element: property-value (#PCDATA)

Figure 6:
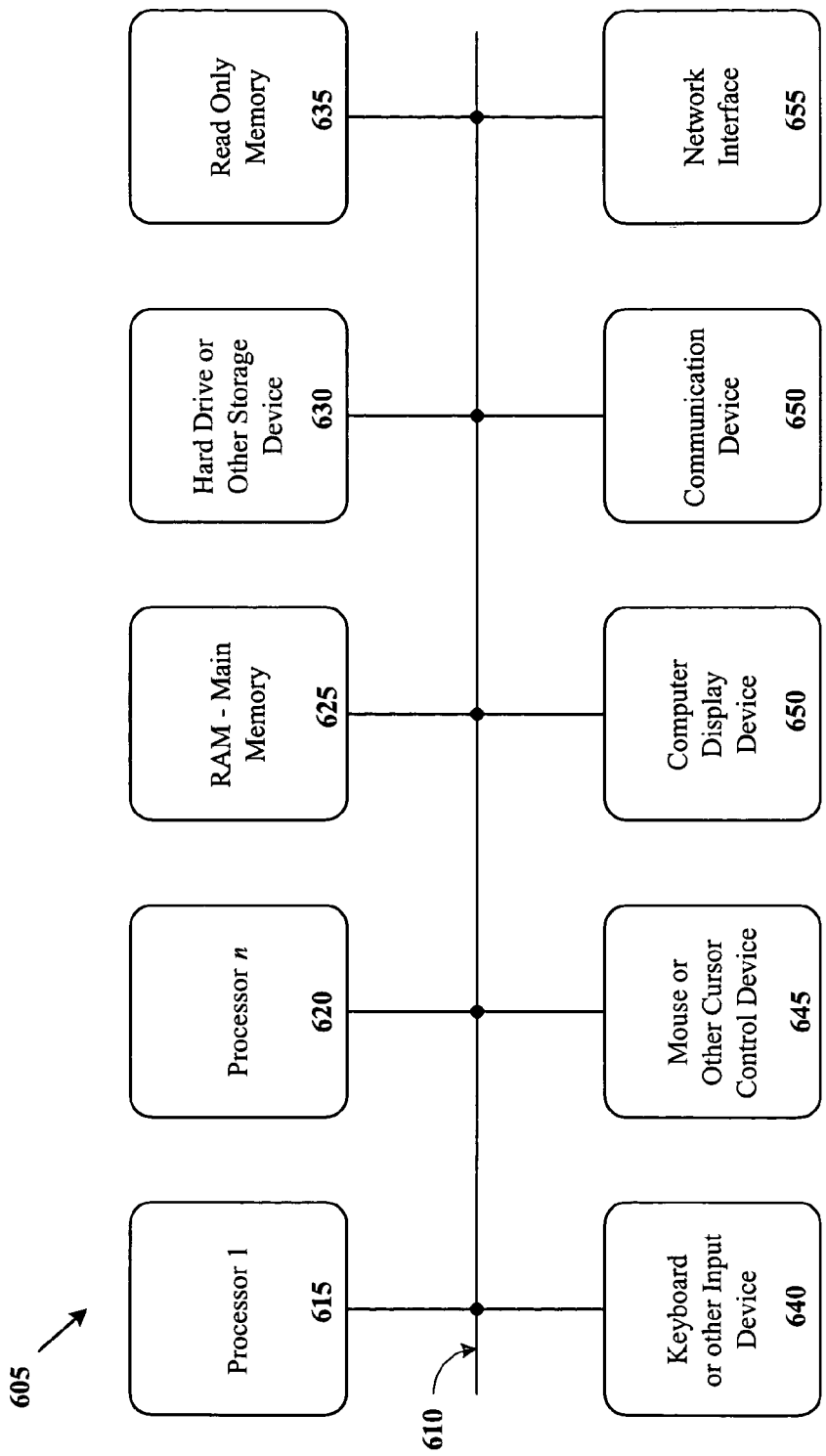
FIG. 6 illustrates an embodiment of an exemplary computer system environment.

FIG. 6 illustrates an embodiment of an exemplary computer system environment. In this illustration, a computer 605 comprises a bus 610 or other means for communicating data. The computer 605 includes one or more processors, illustrated as shown as processor 1 615 through processor n 620 to process information. Under an embodiment of the invention, the computer 605 may comprise a server.

The computer 605 further comprises a random access memory (RAM) or other dynamic storage as a main memory 625 to store information and instructions to be executed by the processors 615 through 620. The RAM or other main memory 625 also may be used for storing temporary variables or other intermediate information during execution of instructions by the processors 615 through 620.

A hard drive or other storage device 630 may be used by the computer 605 for storing information and instructions. Under an embodiment of the invention, a resource adapter archive file may be stored on the storage device 630. Under an embodiment of the invention, the resource adapter archive file may include deployment information for use in the deployment of a resource adapter. The storage device 630 may include a magnetic disk or optical disc and its corresponding drive, flash memory or other nonvolatile memory, or other memory device. Such elements may be combined together or may be separate components. The computer 605 may include a read only memory (ROM) 635 or other static storage device for storing static information and instructions for the processors 615 through 620.

A keyboard or other input device 640 may be coupled to the bus 610 for communicating information or command selections to the processors 615 through 620. The input device 640 may include a keyboard, a keypad, a touch-screen and stylus, a voice-activated system, or other input device, or combinations of such devices. The computer may further include a mouse or other cursor control device 645, which may be a mouse, a trackball, or cursor direction keys to communicate direction information and command selections to the processors and to control cursor movement on a display device. The computer 605 may include a computer display device 650, such as a cathode ray tube (CRT), liquid crystal display (LCD), or other display technology, to display information to a user. In some environments, the display device may be a touch-screen that is also utilized as at least a part of an input device. In some environments, the computer display device 650 may be or may include an auditory device, such as a speaker for providing auditory information.

A communication device 650 may also be coupled to the bus 610. The communication device 650 may include a modem, a transceiver, a wireless modem, or other interface device. The computer 605 may be linked to a network or to other device using via an interface 655, which may include links to the Internet, a local area network, or another environment. A computer 605 that comprises a server may connect to multiple client devices, to other servers, or to other types of devices via the interface 655. In one embodiment the computer 605 comprises a Java compatible server that is connected to user devices and to external resources.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
storing deployment information for a resource adapter in a first file, the deployment information contained in the first file including a plurality of customization elements to configure the resource adapter for connecting a plurality of server applications to an external resource via the resource adapter, the customization elements to include
information identifying a loader of the resource adapter,
connection information specifying a maximum number of connections to the external resource and expiration parameters for connections provided by the resource adapter,
information to enable authentication of the plurality of server applications to the external resource, and
alias information identifying the resource adapter for use by the plurality of server applications,
wherein the first file is included in a resource adapter archive (RAR) file and is created utilizing a document type description (DTD), the RAR file also including a second file created utilizing the DTD, the second file storing standard deployment information, the deployment information contained in the first file being in addition to the standard deployment information contained in the second file;
deploying the resource adapter comprising implementing at deploy time the customization elements from the first file to configure the resource adapter for connection of the plurality of server applications to the external resource;
receiving a plurality of requests to connect the plurality of server applications to the external resource, wherein each of the plurality of server applications identifies the configured resource adapter based on the loader and alias information; and
providing a connection between the plurality of server applications and the external resource via the configured resource adapter.

2. The method of claim 1, wherein the resource adapter is deployed in a Java environment.

3. The method of claim 1, wherein the information to enable authentication of the plurality of server applications to the external resource comprises an identify element.

4. The method of claim 1, wherein the deployment information contained in the first file includes a driver element to define a driver to be used to obtain a connection to a relational database.

5. The method of claim 1, wherein the second file is an ra.xml file.

6. The method of claim 1, wherein the deployment information contained in the first file includes a user store element to define a configuration for the resource adapter to store authentication information.

7. The method of claim 1, wherein the connection information includes a maximum time to wait for a connection to the external resource.

8. The method of claim 1, wherein the expiration parameters include an expiration control element to define a time limit for the plurality of connections provided by the resource adapter.

9. A server comprising:
a plurality of applications to be connected with an external resource;
a memory including a resource adapter archive (RAR) file, the RAR file including a first file and a second file created utilizing a document type description (DTD), the first file containing deployment information for a resource adapter to connect the plurality of applications and the external resource and the second file containing standard deployment information, the deployment information contained in the first file providing customization elements in addition to the standard deployment information contained in the second file, the customization elements to include
information identifying a loader of the resource adapter,
connection information specifying a maximum number of connections to the external resource and expiration parameters for connections provided by the resource adapter,
information to enable authentication of the plurality of server applications to the external resource, and
alias information identifying the resource adapter for use by the plurality of server applications; and
a resource system to provide a plurality of connections between each of the plurality of applications and the external resource utilizing the resource adapter, the resource adapter to be configured at deploy time for the plurality of connections between each of the plurality of applications and the external resource based at least in part on the deployment information contained in the first file and each of the plurality of server applications to identify the configured resource adapter based on the loader and alias information.

10. The server of claim 9, wherein the server is a Java server.

11. The server of claim 9, wherein the information to enable authentication of the plurality of server applications to the external resource comprises an identify element.

12. The server of claim 11, wherein the second file is an ra.xml file.

13. The server of claim 9, wherein the connection information includes a maximum time to wait for a connection to the external resource.

14. The server of claim 9, wherein the expiration parameters include an expiration control element to define a time limit for the plurality of connections provided by the resource adapter.

15. A computer-readable storage medium having stored thereon data representing sequences of instructions that, when executed by a processor, cause the processor to perform operations comprising:

storing deployment information for a resource adapter in a first file, the deployment information contained in the first file including a plurality of customization elements to configure the resource adapter for connecting a plurality of server applications to an external resource via the resource adapter, the customization elements to include information identifying a loader of the resource adapter, connection information specifying a maximum number of connections to the external resource and expiration parameters for connections provided by the resource adapter, information to enable authentication of the plurality of server applications to the external resource, and alias information identifying the resource adapter for use by the plurality of server applications, wherein the first file is included in a resource adapter archive (RAR) file and is created utilizing a document type description (DTD), the RAR file also including a second file created utilizing the DTD, the second file storing standard deployment information, the deployment information contained in the first file being in addition to the standard deployment information contained in the second file;

deploying the resource adapter comprising implementing at deploy time the customization elements from the first file to configure the resource adapter for connection of the plurality of server applications to the external resource;

receiving a plurality of requests to connect the plurality of server applications to the external resource, wherein each of the plurality of server applications identifies the configured resource adapter based on the loader and alias information; and providing a connection between the plurality of server applications and the external resource via the configured resource adapter.

16. The medium of claim 15, wherein the resource adapter is deployed in a Java environment.

17. The medium of claim 15, wherein the information to enable authentication of the plurality of server applications to the external resource comprises an identify element.

18. The medium of claim 15, wherein the deployment information contained in the first file includes a driver element to define a driver to be used to obtain a connection to a relational database.

19. The medium of claim 15, wherein the second file is an ra.xml file.

20. The medium of claim 15, wherein the connection information includes a maximum time to wait for a connection to the external resource.

21. The medium of claim 15, wherein the expiration parameters include an expiration control element to define a time limit for the plurality of connections provided by the resource adapter.

22. The method of claim 1, wherein the first file and the second file are both located under a META-INF directory of the RAR file.

23. The server of claim 9, wherein the first file and the second file are both located under a META-INF directory of the RAR file.

* * * * *

UNITED STATES PATENT AND TRADEMARK OFFICE
CERTIFICATE OF CORRECTION

PATENT NO. : 7,657,658 B2  Page 1 of 1
APPLICATION NO. : 10/863159
DATED : February 2, 2010
INVENTOR(S) : Tankov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Twenty-eighth Day of December, 2010

David J. Kappos
*Director of the United States Patent and Trademark Office*